United States Patent [19]

Thompson et al.

[11] Patent Number: 5,664,720
[45] Date of Patent: Sep. 9, 1997

[54] FRUIT THINNING APPARATUS

[76] Inventors: Ronald E. Thompson; Refugio Salazar, both of Rte. 2, Box 1036, Oroville, Wash. 98844

[21] Appl. No.: 563,367

[22] Filed: Nov. 28, 1995

[51] Int. Cl.$^6$ .................................................. A01D 46/24
[52] U.S. Cl. .................................................. 224/625; 224/661
[58] Field of Search .................................. 224/623, 625, 224/626, 638, 645, 656, 661, 677, 222

[56] References Cited

U.S. PATENT DOCUMENTS

| | | |
|---|---|---|
| D. 226,743 | 4/1973 | Lee . |
| D. 258,997 | 4/1981 | Barnes . |
| 424,271 | 3/1890 | Chapman . |
| 464,380 | 12/1891 | McClay . |
| 519,371 | 5/1894 | Wright . |
| 558,022 | 4/1896 | Aspden ............... 224/222 X |
| 1,098,949 | 6/1914 | Larrabee . |
| 1,170,960 | 2/1916 | Canterbury . |
| 1,276,453 | 8/1918 | Tussing . |
| 1,339,338 | 5/1920 | Hickok . |
| 1,404,163 | 1/1922 | Pim ..................... 224/638 X |
| 1,865,353 | 6/1932 | Brewster ............. 224/625 X |
| 1,994,362 | 3/1935 | Kavanagh . |
| 2,656,968 | 10/1953 | Tidwell . |
| 2,912,028 | 11/1959 | Houldsworth . |
| 3,194,375 | 7/1965 | Callow, Sr. . |
| 3,326,345 | 6/1967 | Staffend et al. . |
| 4,476,670 | 10/1984 | Ukai et al. . |
| 4,836,426 | 6/1989 | Munn et al. ............ 224/625 |
| 4,974,761 | 12/1990 | Luque . |
| 5,158,220 | 10/1992 | Glass . |
| 5,445,303 | 8/1995 | Cawile, Jr. ............ 224/222 |

Primary Examiner—Renee S. Luebke
Attorney, Agent, or Firm—Wells, St. John, Roberts, Gregory & Matkin, P.S.

[57] ABSTRACT

A fruit thinning apparatus for reducing fruit bruises caused when thinned fruit is discarded and strikes fruit left on the tree. The apparatus includes a chute having an upper portion which is supported upon a person's torso using a harness. A lower portion of the chute extends along the person's leg and is held in position by leg connectors, preferably at both the upper and lower leg. The outlet end is provided with an adjustable cuff to accommodate different heights of people. A cinch is used along medial portions of the chute to allow thinned fruit to be held and then released when the outlet is in a position where damage will not occur.

30 Claims, 2 Drawing Sheets

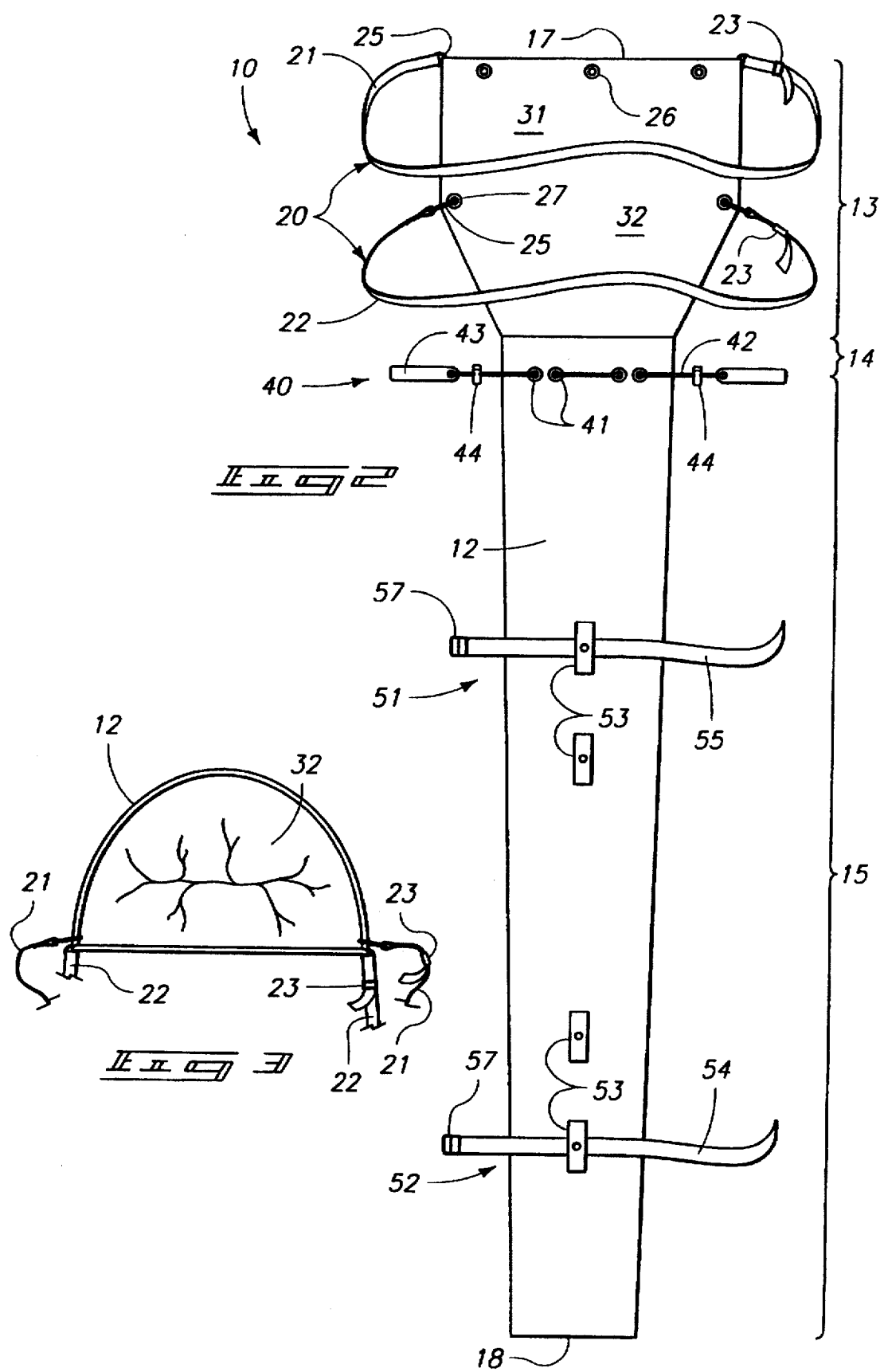

FRUIT THINNING APPARATUS

TECHNICAL FIELD

The technical field of this invention is apparatus used in the thinning of fruit from fruit trees.

BACKGROUND OF THE INVENTION

Orchards of fruit trees typically need to be thinned. Thinning is needed in fruit trees such as apple, pear, peach, orange, grapefruit and others because the fruit when fully developed may weigh more than the tree will support. Thinning is also employed to allow the better and healthier fruits to develop to a larger size. Such larger sized fruit frequently bring a better price for the grower.

One problem which has long troubled orchardists is the damage which occurs to fruit which remains on the tree as a result of the thinning process. For example, in the growing of apples it is usually necessary to employ human pickers to work in the trees and remove excess apples while the apples are still small. However, it is difficult for the pickers who remove the smaller apples in the thinning process to discard the thinned fruit without hitting apples which are to remain on the trees until harvest. When a thinned apple is discarded so as to strike a remaining apple, the remaining apple is bruised. The bruise may not even show at that time because of the hardness of the unripened apple. However, at harvest time the bruise will be apparent and will cause the bruised apple to be downgraded. This causes the grower to lose money.

Thus there has been a long-felt need in the fruit orchard industry for improved apparatus which can be used in the thinning of fruit to reduce the incidence of bruising caused by discard of fruit being thinned.

BRIEF DESCRIPTION OF THE DRAWINGS

Preferred embodiments of the invention are described below with reference to the accompanying drawings, which are briefly described below.

FIG. 2 is a side elevational view of the thinning apparatus of FIG. 1.

FIG. 3 is a top view of the thinning apparatus of FIG. 1.

DETAILED DESCRIPTION OF THE PREFERRED EMBODIMENTS

Figure 1:
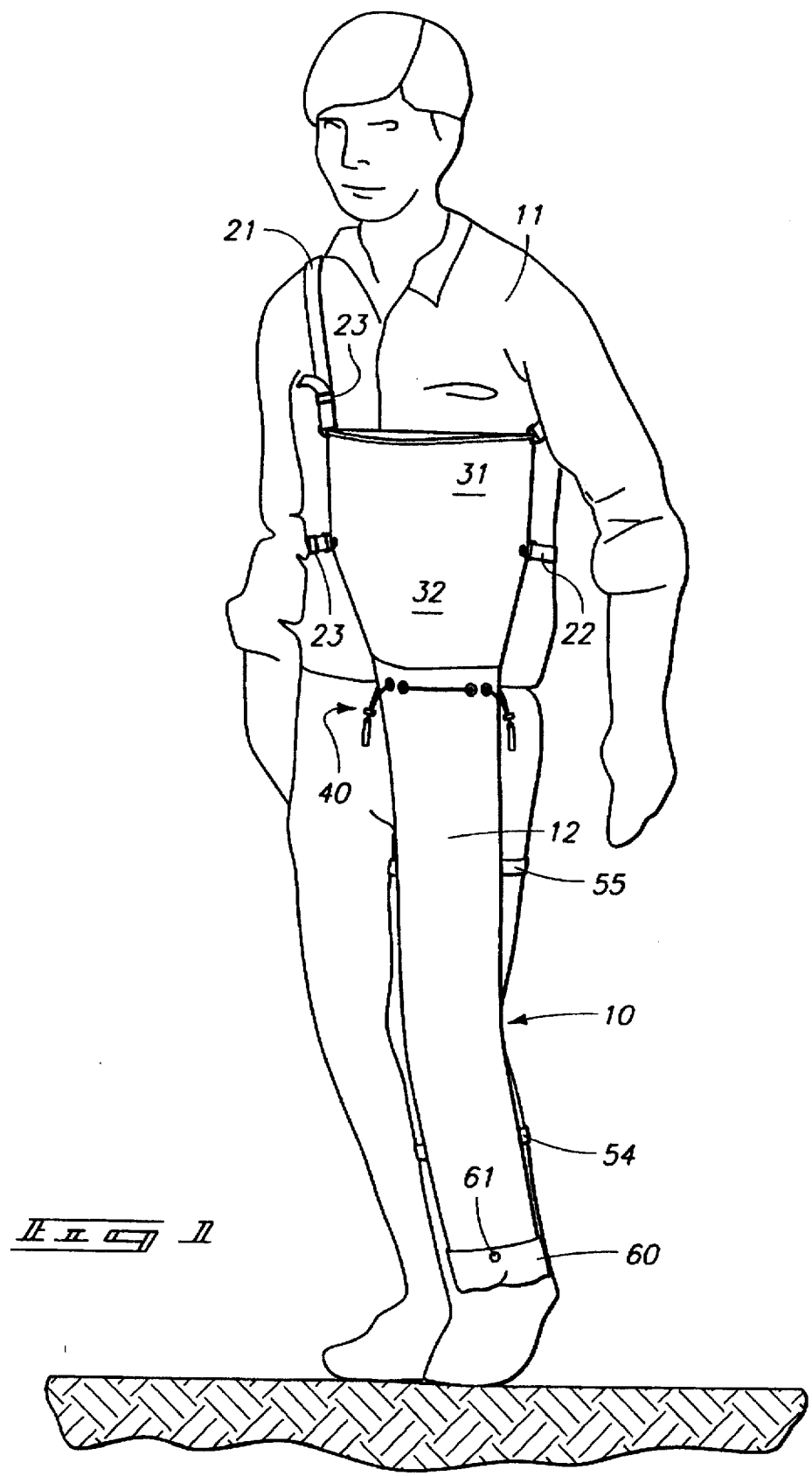
FIG. 1 is a perspective view of a person wearing a preferred fruit thinning apparatus according to this invention.

This disclosure of the invention is submitted in furtherance of the constitutional purposes of the U.S. Patent Laws "to promote the progress of science and useful arts" (Article 1, Section 8).

TABLE 1

Listing of Subsections of Detailed Description and Pertinent Items with Reference Numerals and Page Numbers

| | |
|---|---|
| Chute | 3 |
| fruit thinning apparatus 10 | 3 |
| person 11 | 3 |
| chute 12 | 3 |
| mouth 17 | 3 |
| outlet 18 | 3 |
| upper portions 13 | 3 |
| medial portions 14 | 3 |

TABLE 1-continued

Listing of Subsections of Detailed Description and Pertinent Items with Reference Numerals and Page Numbers

| | |
|---|---|
| lower portions 15 | 3 |
| first section 31 | 4 |
| second or transitional section 32 | 4 |
| Harness | 4 |
| harness 20 | 4 |
| shoulder band or strap 21 | 4 |
| torso band or strap 22 | 4 |
| detachable and adjustable couplings 23 | 5 |
| end rings 25 | 5 |
| harness connection grommets 26 and 27 | 5 |
| Cinch | 5 |
| cinch 40 | 5 |
| cinch grommets 41 | 6 |
| cinch cord or cords 42 | 6 |
| cinch pulls 43 | 6 |
| detachable cord stop 44 | 6 |
| Leg Connectors | 6 |
| upper leg connector 51 | 6 |
| lower leg connector 52 | 6 |
| chute loops 53 | 6 |
| leg bands 53 and 54 | 7 |
| leg band connection couplings 57 | 7 |
| Adjustable Cuff | 7 |
| adjustable cuff 60 | 7 |
| snaps 61 | 7 |
| Manner of Using Apparatus | 7 |

*(End of Table 1)*

Chute

FIG. 1 shows a preferred fruit thinning apparatus 10 made in accordance with this invention installed for use on a person 11. Apparatus 10 includes a chute 12. Chute 12 is provided with a mouth 17 and outlet 18. Chute 12 also has an upper portions 13, medial portions 14, and lower portions 15.

Chute 12 is preferably shaped to provide a relatively larger mouth 17 as compared to the relatively smaller outlet 18. The larger mouth is included to facilitate easy placement of thinned fruit through the mouth and into the chute. The smaller outlet provides controlled discharge of the thinned fruit during use and when emptied in batches. The chute is preferably tapered between the upper portions 13 toward the outlet 18 to reduce bulk and make it easier for the person thinning fruit to maneuver within the tree.

In the embodiment shown, the upper portions 13 of the chute are preferably shaped to form a first section 31 and a second or transitional section 32. The first section 31 is roughly cylindrical in shape, whereas the transitional section tapers at a high rate toward the medial portion 14. The lower portions 15 also preferably taper in a continuous fashion from the medial portion 14 toward the outlet 18.

Chute 12 is preferably formed using a flexible material which is thin and strong. Fabric materials are preferred, and in particular durable, water-resistant materials, such as nylon fabric make a desirable construction. The chute is formed by sewing or otherwise forming the fabric other materials into the desired shape as illustrated.

Harness

The upper portions are supported upon and adjacent to the torso of person 11 using a harness 20. As shown, harness 20 includes a shoulder band or strap 21 and a torso band or strap 22. Straps 21 and 22 are preferably provided with detachable and adjustable couplings 23 which allow the ends of the straps to be connected and disconnected from the chute.

Couplings 23 also allow the effective length of each strap to be adjusted to better fit different sized persons wearing the apparatus. The use of a shoulder strap and torso strap provides advantage in that the weight of the apparatus can be better carried by shoulder strap 21 and the upper portions can be better kept close to the wearer's torso by using torso strap 22.

Harness straps 21 and 22 are also preferably secured at the opposing ends to chute 12 using end rings 25. End rings 25 and detachable connectors 23 preferably connect with the chute at metal harness connection grommets 26 and 27. Other suitable means can alternatively be employed.

Harness 20 can advantageously be made from a variety of suitable strapping materials, such as using woven strap materials. Couplings 23 and end rings 25 can also be selected from a variety of commercially available fittings.

Cinch

Medial portions 14 are preferably provided with a cinch 40 which is advantageously intermediate the mouth 17 and at least one leg connector 51 or 52.

Cinch 40 is advantageously provided at or immediately below the relatively highly tapered transition section 32. As shown, cinch 40 includes plurality of apertures which are preferably formed using cinch grommets 41. Grommets 41 are secured in position at numerous positions about the girth of the medial portion of the chute.

A cinch cord or cords 42 extend through the array of grommets 41. The cord or cords are advantageously provided with cinch pulls 43 which are grasped by the user's hand and pulled to tighten the cinch into a closed condition. A detachable cord stop 44 is preferably provided at each side of the cord or drawstring 42 to lock the cinch into a closed condition.

The cinch is capable of being adjusted between open and closed positions depending upon whether the user wants the thinned fruit to pass through the chute, or for it to be held for a more appropriate place when the fruit can be better discharged without risk of bruising fruit which remains on the tree.

Leg Connectors

Th fruit thinning apparatus 10 also preferably includes at least one leg connector. As shown, apparatus 10 includes an upper leg connector 51 and a lower leg connector 52. Leg connectors 51 and 52 preferably include chute loops 53 which are sewn or otherwise affixed to the chute. There are a plurality of loops 53 at different longitudinal positions along the lower portions 15 of the chute. This allows leg connectors to be adjusted to the needs of the particular wearer. It is also noteworthy that the positioning of loops 53 is preferably done so that at least one leg connector extends about the thigh or upper portion of the person's leg, and at least one leg connector extends about the calf or lower portion of the person's leg. This construction is superior in keeping the apparatus close to the user's body; thus preventing the user from becoming caught while maneuvering within the limbs of the fruit trees.

Connectors 51 and 52 also preferably include leg bands 55 and 54. Leg bands 55 and 54 extend about a person's leg and are detachably secured using leg band connection couplings 57. A variety of couplings can be used.

Adjustable Cuff

The lower end of chute 12 is also preferably provided with an adjustable cuff 60. Adjustable cuff 60 can include one or more snaps 61 which allow the cuff to be worn full length or turned up to a desired position.

Manner of Using Apparatus

The thinning apparatus 10 is used by first installing the apparatus onto the body of the user. This is advantageously done by disconnecting couplings 23 and extending strap 21 over the shoulder and then reconnecting the coupling with the chute. Strap 22 is similarly extended about the torso of the user and then coupling 23 is connected to the chute.

The user also preferably connects the leg connectors to his left or right leg at the upper leg and lower leg. This is done by extending the leg connection straps 53 and 54 about the user's leg and then securing the couplings 57. The cuff 60 is then adjusted to a desired height.

After the apparatus is installed upon the user, the user is free to climb ladders or otherwise about the fruit tree. The user then picks the fruit to be thinned and drops the fruit into the mouth 17 of the chute. If the user is positioned in the tree such that the outlet 18 will not drop upon fruit remaining in the tree, then cinch 40 can be left in an open condition and the fruit is conveyed through the chute and out the outlet. If the user wishes to hold fruit for later discharge, then the cinch 40 is closed and the fruit is stored in the upper portions 13 of the chute until discharge is desired.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A fruit thinning apparatus, comprising:
    a chute, the chute having a mouth at an upper end of the chute and an outlet at a lower end of the chute;
    a harness connected to the chute for supporting upper portions of the chute upon a person's torso;
    at least one leg connector attached to the chute for holding lower portions of the chute to a leg of the person;
    a cinch positioned between at least one leg connector and said mouth of the chute for controlling discharge of fruit from the outlet of the chute.

2. A fruit thinning apparatus according to claim 1 and further characterized by a plurality of leg connectors.

3. A fruit thinning apparatus according to claim 1 and further characterized by a plurality of leg connectors, the plurality of leg connectors including:
    an upper leg connector for holding an upper portion of the person's leg;
    a lower leg connector for holding a lower portion of the person's leg.

4. A fruit thinning apparatus according to claim 1 and further characterized in that the at least one leg connector includes a band which extends about the person's leg.

5. A fruit thinning apparatus according to claim 1 and further characterized in that the at least one leg connector includes a band which extends about the person's leg; the band having a detachable coupling.

6. A fruit thinning apparatus according to claim 1 and further characterized in that the at least one leg connector is adjustable to allow different longitudinal positions at which the connector is attached to the chute.

7. A fruit thinning apparatus according to claim 1 and further characterized in that:

the at least one leg connector is adjustable to allow different longitudinal positions at which the connector is attached to the chute;

the at least one leg connector includes a band which extends about the person's leg; the band having a detachable coupling.

8. A fruit thinning apparatus according to claim 1 and further characterized by a plurality of leg connectors, the plurality of leg connectors including:

an upper leg connector for holding an upper portion of the person's leg;

a lower leg connector for holding a lower portion of the person's leg;

the leg connectors being adjustable to allow different longitudinal positions at which the connector is attached to the chute.

9. A fruit thinning apparatus according to claim 1 and further characterized by a plurality of leg connectors, the plurality of leg connectors including:

an upper leg connector for holding an upper portion of the person's leg;

a lower leg connector for holding a lower portion of the person's leg;

the leg connectors being adjustable to allow different longitudinal positions at which the connector is attached to the chute;

the leg connectors including a band which extends about the person's leg; the band having a detachable coupling.

10. A fruit thinning apparatus according to claim 1 wherein said cinch is connected to medial portions of the chute which is capable of being opened to allow fruit to pass through the chute, or closed to hold fruit in upper portions of the chute.

11. A fruit thinning apparatus according to claim 1 and further characterized in that the harness includes:

a shoulder band for extending about the shoulder of the person;

a torso band for extending about the torso of the person.

12. A fruit thinning apparatus according to claim 1 and further characterized by an adjustable cuff at the outlet of the chute to allow the length of the chute to be adjusted.

13. A fruit thinning apparatus, comprising:

a chute, the chute having a mouth at an upper end of the chute and an outlet at a lower end of the chute;

a harness connected to the chute for supporting upper portions of the chute upon a person's torso;

a cinch connected to medial portions of the chute which is capable of being opened to allow fruit to pass through the chute, or closed to hold fruit in upper portions of the chute;

a plurality of leg connectors attached to the chute for holding lower portions of the chute to a leg of the person.

14. A fruit thinning apparatus according to claim 13 and further characterized in that the plurality of leg connectors includes:

an upper leg connector for holding an upper portion of the person's leg;

a lower leg connector for holding a lower portion of the person's leg.

15. A fruit thinning apparatus according to claim 13 and further characterized in that at least one of the plurality of leg connectors includes a band which extends about the person's leg.

16. A fruit thinning apparatus according to claim 13 and further characterized in that at least one of the plurality of leg connectors includes a band which extends about the person's leg; the band having a detachable coupling.

17. A fruit thinning apparatus according to claim 13 and further characterized in that at least one of the plurality of leg connectors is adjustable to allow different longitudinal positions at which the connector is attached to the chute.

18. A fruit thinning apparatus according to claim 13 and further characterized in that:

at least one of the plurality of leg connectors is adjustable to allow different longitudinal positions at which the connector is attached to the chute;

at least one of the plurality of leg connectors includes a band which extends about the person's leg; the band having a detachable coupling.

19. A fruit thinning apparatus according to claim 13 and further characterized in that the harness includes:

a shoulder band for extending about the shoulder of the person;

a torso band for extending about the torso of the person.

20. A fruit thinning apparatus according to claim 13 and further characterized by an adjustable cuff at the outlet of the chute to allow the length of the chute to be adjusted.

21. A fruit thinning apparatus, comprising:

a chute, the chute having a mouth at an upper end of the chute and an outlet at a lower end of the chute;

a harness connected to the chute for supporting upper portions of the chute upon a person's torso;

at least one leg connector attached to the chute for holding lower portions of the chute to a leg of the person, the at least one leg connector being adjustable to allow different longitudinal positions at which the connector is attached to the chute.

22. A fruit thinning apparatus according to claim 21 and further characterized by a plurality of leg connectors.

23. A fruit thinning apparatus according to claim 21 and further characterized by a plurality of leg connectors, the plurality of leg connectors including:

an upper leg connector for holding an upper portion of the person's leg;

a lower leg connector for holding a lower portion of the person's leg.

24. A fruit thinning apparatus according to claim 21 and further characterized in that the at least one leg connector includes a band which extends about the person's leg.

25. A fruit thinning apparatus according to claim 21 and further characterized in that the at least one leg connector includes a band which extends about the person's leg, the band having a detachable coupling.

26. A fruit thinning apparatus according to claim 21 and further characterized by a plurality of leg connectors, the plurality of leg connectors including:

an upper leg connector for holding an upper portion of the person's leg;

a lower leg connector for holding a lower portion of the person's leg;

the leg connectors being adjustable to allow different longitudinal positions at which the connector is attached to the chute.

27. A fruit thinning apparatus according to claim 21 and further characterized by a plurality of leg connectors, the plurality of leg connectors including:

an upper leg connector for holding an upper portion of the person's leg;

a lower leg connector for holding a lower portion of the person's leg;

the leg connectors being adjustable to allow different longitudinal positions at which the connector is attached to the chute;

the leg connectors including a band which extends about the person's leg; the band having a detachable coupling.

28. A fruit thinning apparatus according to claim 21 and further characterized by a cinch connected to medial portions of the chute which is capable of being opened to allow fruit to pass through the chute, or closed to hold fruit in upper portions of the chute.

29. A fruit thinning apparatus according to claim 21 and further characterized in that the harness includes:

a shoulder band for extending about the shoulder of the person;

a torso band for extending about the torso of the person.

30. A fruit thinning apparatus according to claim 21 and further characterized by an adjustable cuff at the outlet of the chute to allow the length of the chute to be adjusted.

* * * * *

UNITED STATES PATENT AND TRADEMARK OFFICE
CERTIFICATE OF CORRECTION

PATENT NO. : 5,664,720
DATED : September 9, 1997
INVENTOR(S) : Thompson, et. al.

It is certified that error appears in the above-identified patent and that said Letters Patent is hereby corrected as shown below:

Column 2, line 53, delete the word [roedial] and substitute therefor --medial--.

Column 2, line 58, after the word "fabric", insert --or--.

Signed and Sealed this

Tenth Day of February, 1998

Attest:

BRUCE LEHMAN

*Attesting Officer*    *Commissioner of Patents and Trademarks*